Nov. 26, 1968    O. P. OMLEY    3,412,917

BONDING OR BRAZING APPARATUS

Filed Oct. 21, 1965

INVENTOR
Ole P. Omley
Harold L. Fox
AGENT

United States Patent Office 3,412,917
Patented Nov. 26, 1968

3,412,917
BONDING OR BRAZING APPARATUS
Ole P. Omley, Inglewood, Calif., assignor to Northrop Corporation, Beverly Hills, Calif., a corporation of California
Filed Oct. 21, 1965, Ser. No. 499,910
1 Claim. (Cl. 228—44)

ABSTRACT OF THE DISCLOSURE

A press facility adapted to have a cellular core panel or the like fabricated thereon. The fabrication operation comprising a brazing operation performed on different portions of the panel at different pressures, a first pressure equal to the actual pressure exerted by the press and a second pressure normally less than the actual pressure exerted by the press.

---

The present invention pertains to equipment useful in effecting a metal working operation and more particularly to equipment facilitating the fabrication of a sandwich type panel useable in the internal construction of an aircraft or space vehicle.

Sandwich panels of the type referred to herein consist of cover sheets having expanded honeycomb core or similar filler material brazed or otherwise secured therebetween. The edges of the cover sheets are also brazed or otherwise secured together thereby providing means whereby the panels can be secured to suitable structure. Panels of this type are generally utilized as partitions, bulkheads, etc., internally of the vehicle in which they are utilized.

In the fabrication of panels of the type referred to herein, it becomes desirable—in fact imperative in most instances—that different pressures be applied to different portions of the panels if effective bonding or brazing operations are to be effected. Normally this difference in pressure is effected by maintaining extremely close tolerances on parts and tools utilized in the fabrication operation whereby equal pressure applied thereto will be transmitted in varying amounts to various portions of the subject panels. This procedure is very impractical as maintaining the tolerances referred to above is very difficult, is time consuming and costly.

Accordingly a principal object of the present invention is to disclose a tool adapted to apply different pressures to different portions of an assembly being fabricated thereby in response to equal pressure applied to the tool.

Another object is to provide a tool adapted to apply different pressures to different portions of a final assembly which is simple and rugged in design, does not require close tolerances in its manufacture and, therefore, is economical to manufacture.

Although the characteristic features of the present invention are particularly pointed out in the appended claims, the invention itself, also the manner in which it may be carried out, will be better understood by referring to the following description taken in connection with the accompanying drawings forming a part of this application and in which:

The equipment as disclosed herein is especially useful in fabricating (brazing or bonding) a core type panel assembly normally utilized as bulk head or partition construction internally of an aircraft or space vehicle. The panel assembly referred to herein consists of a pair of cover sheet members having a core of expanded honeycomb material and in which the edge portions of the cover sheet members are brazed or bonded together to provide means whereby the assembly may be mounted to suitable structure.

Briefly the fabrication equipment as disclosed herein consists of a conventional mechanical or hydraulically actuated press including bed and ram members. The equipment also includes a die assembly consisting of a frame-like member and a pair of sheet members, the latter members being secured to the side surfaces of the frame-like member. The space defined by the sheet and frame-like members are rendered fluid tight except for means permitting controlled ingress and egress of fluid to and from the space referred to above. The lower sheet member of the die assembly is shaped to conform to the upper surface of the panel assembly while the upper sheet member is coplanar and is perfectly flat. This particular configuration of components of the die assembly allows it to be positioned in an overlaying and surrounding relation with respect to the panel assembly at such times as the latter is positioned on the bed member of the press. Further regarding the configuration of components comprising the die assembly; the frame-like member is of a size insuring that the sides thereof will bear directly on the edges of the cover sheet members while lower sheet member of the die assembly contours to the upper cover sheet member.

The ram member is now lowered to its full-down position, under these conditions it will be apparent that relative high pressure will be applied to the edges of the cover sheet members while the body of the panel assembly (honeycomb core material) will be relatively free of any pressure. Thus substantially all the pressure applied by the press is transmitted to the edges of the cover sheets insuring a good brazing or bonding operation at this location while substantially no pressure is applied to the core material. Suitable contact between the upper cover sheet member and the core material may be effected if required by pressurizing the aforementioned space within the frame-like member. Also means are provided whereby a negative pressure may be created within the envelope defined by the pair of cover sheet members, thus complete and firm contact is assured between the lower cover sheet and core material and a good braze or bond insured at this location.

Figure 1:
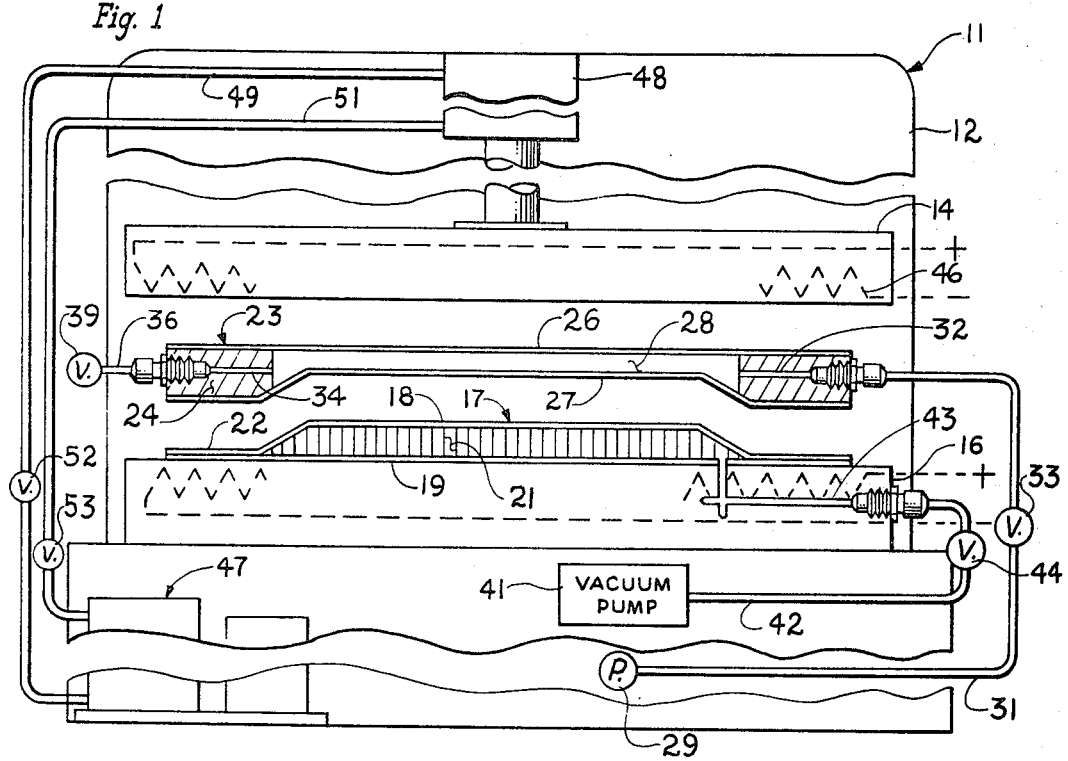
FIGURE 1 is a longitudinal sectional view of the bonding or brazing equipment as disclosed herein, a panel constructed as referred to herein is shown on the bed of the equipment and with the ram and die members in their elevated positions.
Figure 2:
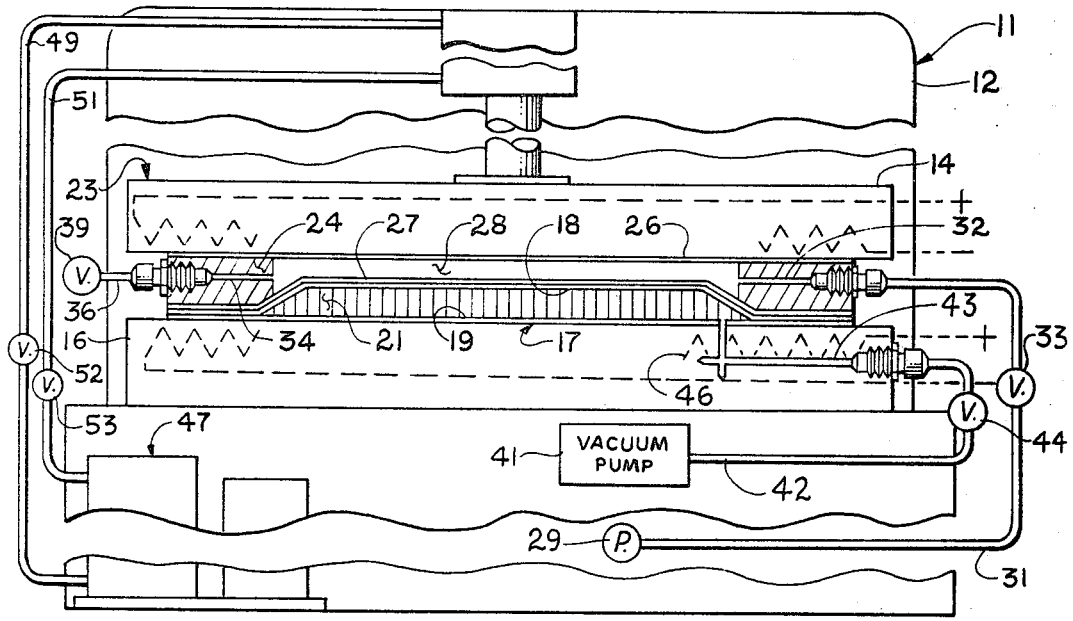
FIGURE 2 is a view similar to FIGURE 1 but with the ram and die in their lowered positions.

Referring to the figures, the equipment or facility as disclosed herein is indicated in its entirety by the numeral 11 in FIGURES 1 and 2. The facility 11 comprises a conventional mechanical or hydraulically actuated press 12 having bed plate and ram members 14 and 16, respectively.

The panel assembly 17 as referred to herein is shown in position to be brazed on the bed plate member of the press 12 in FIGURE 1. The assembly 17 consists of a pair of spaced cover sheet members 18 and 19 having honeycomb material 21 positioned therebetween. It will be seen that the upper sheet 18 (FIGURES 1 and 2) is contoured to embrace the upper surface of the material 21 while the lower sheet 19 is perfectly flat and therefore has a complete contacting relation with the upper surface of the bed plate member 16. The edges of the sheets 18 and 19 extend beyond the edges of the core material as indicated by the numeral 22 and provide means for securing the assembly 17 when fabricated to suitable structure.

Overlaying the panel assembly 17 and surrounding the body portion thereof is a die assembly 23 consisting of a framelike member 24 the sides of which are substantially rectangular in cross-section. Secured to the respective side surfaces of the member 24 are sheets 26 and 27 constructed of a material having a small degree of flexibility. It will be noted that the upper sheet member 26 is entirely flat so that a full contacting relation is provided therebetween and the lower surface of the ram member 14 at such time as the latter is urged to its full-down portion. The lower sheet 27 is contoured to embrace the upper surface of the panel assembly 17.

Prior to a brazing or bonding operation the assembly 23 is placed in an overlaying position with respect to the panel assembly 17 substantially as shown in FIGURE 2. So positioned it will be seen that the sides of the frame-like member 24 are directly over and bear on the edge portions 22 of the sheets 18 and 19. Under the conditions just described, it will now be apparent that the full force (pressure) of the press 12 are transmitted to the edge portions 22 while very little pressure—if any—will be applied to the body portion of the panel assembly 17.

The space or chamber 28 defined by the sheet members 26 and 27 and the frame-like member 24 may be pressurized by admitting pressurized fluid thereto. This is accomplished by directing pressurized fluid from a pump 29 through a conduit 31 and a passageway 32, the latter being provided in a side portion of the frame-like member 24. A valve 33 is provided in the conduit 31 functioning when actuated to control or arrest the flow of fluid therethrough. In this respect, it will be seen that a passageway 34 and conduit 36 are provided in the side portion of the member 23 opposite the portion in which the passageway 32 is located. A valve 39 is provided in the conduit 36 by means of which pressurized fluid may be allowed to escape from the chamber 28 or flow of fluid therefrom arrested.

During a brazing or bonding operation it may also become necessary to provide complete and firm contact between the lower cover sheet member 19 and the core material 21. To effect this feature means are provided for applying a vacuum inside the envelope defined by the cover sheets 18 and 19. Means (apparatus) for effecting this vacuum consists of a vacuum pump 41 communicating with the above mentioned envelope through a conduit 42, passageway 43 and an aperture 45 provided in the member 19. In this respect it will be understood that the axis of the upright portion of the passageway 43 and the apertures 45 have a coinciding and fluid tight relation. A valve 44, functioning to allow or arrest fluid flow from and to the aforementioned envelope, provided in the conduit 42. Thus it will be seen with a negative pressure created in the envelope defined by the sheet members 18 and 19, the positive pressure in the chamber 28 will function to provide a complete and firm contact between the lower sheet member 19 and the core material 21.

Elevated temperatures for effecting a brazing or bonding operation of the panel assembly 17 are provided by electrical resistance elements 46 provided in the ram and bed plate members 14 and 16, respectively. Means for operating the ram member 14 in a reciprocal manner are also shown as including a motor pump combination 47 adapted to supply pressurized fluid to a hydraulic cylinder 48 through a conduit 49, fluid being returned to the motor-pump combination is conveyed thereto through a conduit 51. Valve 52 and 53, adapted to permit and arrest fluid flow from and to the cylinder 48, are also provided in the conduits 49 and 51, respectively.

Components of the facility 11 having been described a more complete understanding of the facility 11 will be forthcoming from a description of its operation in connection with the brazing of the panel assembly 17.

The panel assembly 17 is first assembled substantially as shown in FIGURE 1. Assembled in this manner it is positioned on the bed plate portion 16 of the press 12 directly beneath the ram member 14. The assembly 23 is now positioned over the assembly 17 with the contoured sheet member 27 in contact with the cover sheet 18 of the assembly 17 and the side portions of the frame-like member 24 bearing directly on the edge portion 22 of the assembly 17.

The ram member 14 is now lowered and the elements 46 energized so that the operation will be effected at elevated temperatures. With the ram member 14 in its lowered position it will be apparent that the full force of the press 12 is applied to the edge portions 22. Thus necessary pressure is applied to the edge portions 22 insuring a complete and efficient braze at this location while the honeycomb material 21 is subjected to substantially no pressure.

If additional pressure is required to insure a good braze between the upper cover plate 18 and honeycomb material; the pump 29 is rendered operational and the valve 33 opened allowing pressurized fluid flow to enter the space 28. Thus it will be apparent that the cover sheet 18 will be urged into firm contacting relation with the material 21 and a good braze effected between these components. Similarly if better contact is required between the lower cover sheet 19 and the material 21; the pump 41 is rendered operational thereby providing a vacuum in the space defined by the sheets 18 and 19. Thus it will be seen that firm and complete contact will be provided between the lower cover sheet member 19 and the core 21 thus insuring a good and complete braze between the last referred to components.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. In a facility for simultaneously effecting brazing operations at different pressures on a panel assembly comprising a pair of metallic side sheets and a core of cellular material and in which the peripheral portions of the side sheets have an overlaying and contacting relation, the combination comprising:

(a) a press facility including a bed plate and a ram member of substantially the same area as said bed plate the former having elevated and lowered positions with respect to said bed plate;

(b) said press facility including a die member comprising a frame member surrounding an area less than the area of either said bed plate or ram member;

(c) said die member also including flexible metal sheets secured to each side of said frame member in fluid tight relation to define a chamber;

(d) said die member being positioned between said bed plate and ram member;

(e) means in said die member allowing controlled ingress and egress of fluid to and from said chamber;

(f) and said frame member adapted to be positioned in surrounding relation with respect to the panel assembly and bear on the peripheral portions of said side sheets whereby the panel assembly may be subjected to different pressures at such time as said ram member is in its lowered position and said chamber is pressurized.

References Cited

UNITED STATES PATENTS

| | | | |
|---|---|---|---|
| 2,984,732 | 5/1961 | Herbert | 219—85 |
| 3,087,046 | 4/1963 | Mellinger | 219—85 |
| 3,284,607 | 11/1966 | Wernz | 219—85 |

RICHARD H. EANES, JR., *Primary Examiner.*